Nov. 26, 1946. C. A. SAWTELLE 2,411,639
WEAR COMPENSATING BRAKE MECHANISM
Filed Oct. 4, 1944 2 Sheets-Sheet 1
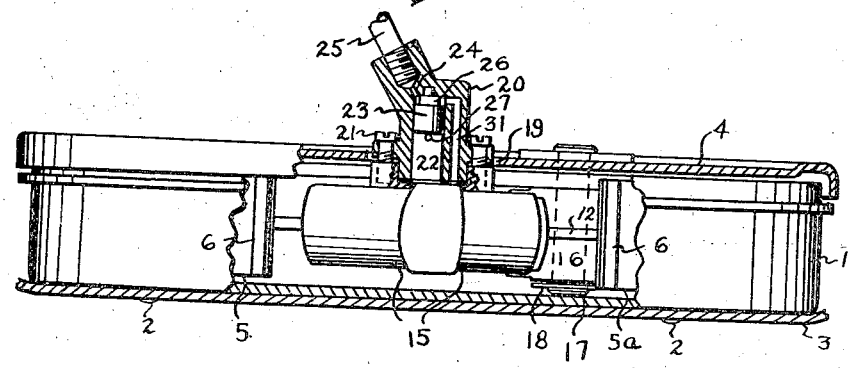
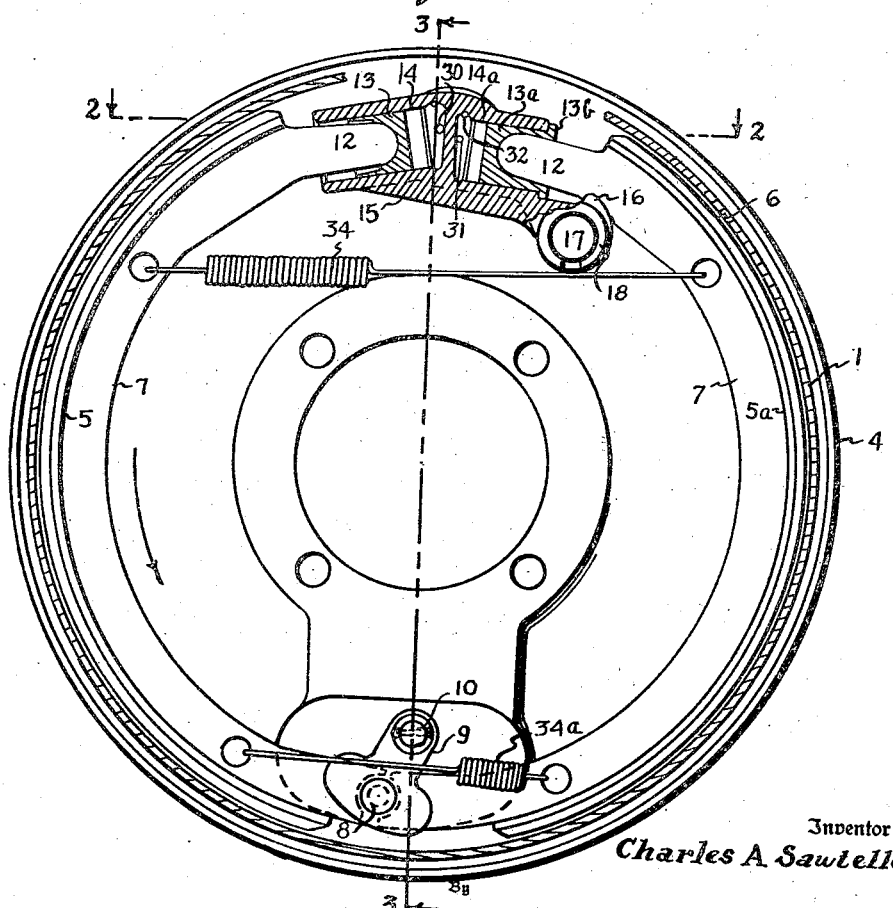
Inventor
Charles A. Sawtelle
J. S. Murray
Attorney

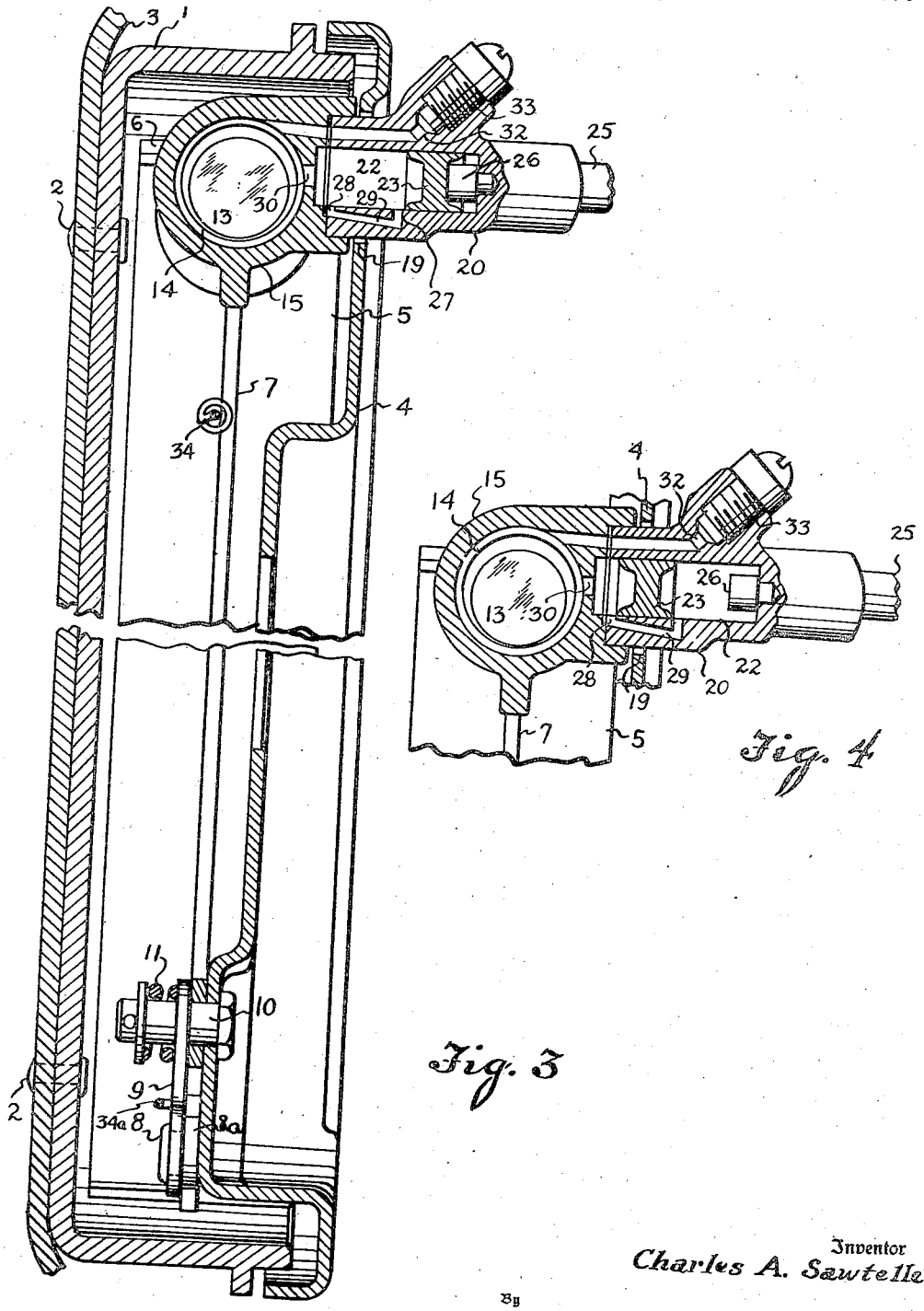

Patented Nov. 26, 1946

2,411,639

UNITED STATES PATENT OFFICE 2,411,639

WEAR COMPENSATING BRAKE MECHANISM

Charles A. Sawtelle, Rosedale Gardens, Mich.

Application October 4, 1944, Serial No. 557,065

1 Claim. (Cl. 188—152)

This invention relates to brakes and particularly hydraulic brakes primarily for motor vehicle use.

An object of the invention is to improve upon the type of brake in which shoes or other friction means are applied to a drum by a pair of reversely actuable pistons, the improvement relating to an automatic hydraulic compensation for wear.

Another object is to provide an improved mounting for a pair of brake shoes affording such shoes a limited circumferential floating travel.

These and various other objects are attained by the construction hereinafter described and illustrated in the accompanying drawings, wherein:

Fig. 1 is a sectional view of improved brake taken in a rotational plane of the brake drum.

Fig. 2 is a plan view of the improved brake, partially in section on the line 2—2 of Fig. 1.

Fig. 3 is a diametrical sectional view of the brake taken on the line 3—3 of Fig. 1.

Fig. 4 is a view duplicating the upper portion of Fig. 3, except that a brake-applying position is shown for the illustrated piston.

In these views, the reference character 1 designates a brake drum secured by suitable fastenings 2 to a vehicle wheel 3 or other rotatable member requiring occasional retardation. Associated with the drum 1 is the usual non-rotative backing plate 4, and a pair of complementary arcuate shoes 5 and 5a, approximately semi-circular and equipped with the usual linings 6, is disposed within the drum to apply restraint thereto. The shoes are provided with the usual inwardly projecting flanges 7, adjoining ends of which are recessed to accommodate a pivot stud 8 rigidly carried by the outer end of an approximately radial sheet metal link 9 having its inner end pivoted on a pin 10 fixed in the backing plate. A spring 11 coiled on said pin exerts pressure on the link to prevent swinging thereof except in response to a shoe actuation. The stud 8 is headed at opposite sides of the link 9, the flanges 7 engaging the head 8a which confronts the backing plate.

At the other adjoined ends of the shoes, their flanges are formed with thrust arms 12 projecting toward each other and having rounded ends set into a pair of pistons 13 and 13a slidable in slightly divergent bores 14 and 14a of a cylinder block 15. The piston 13 is designed to be limited as to its retraction solely by a volume of pressure liquid trapped within the corresponding bore, whereas the piston 13a has an external annular flange 13b at its outer end engageable with the cylinder block to limit the piston retraction. The cylinder block has a supporting extension 16 from the lower portion of its end receiving the piston 13a, said extension engaging a pivot pin 17 which projects rigidly into the drum from the backing plate. A member 18 engaged in an annular groove in the free end of said pin prevents material sliding of the cylinder block thereon.

Adjacent to the mid portion of the cylinder block, the backing plate is apertured as indicated at 19 to accommodate a fluid fitting 20 rigidly secured to the cylinder block by a pair of screws 21. In a bore 22 of said fitting, a piston 23 reciprocates to and from the cylinder block, the outer end of said bore being connected through a port 24 to a pipe 25 supplying a pressure liquid. A button 26 fixed in the outer end wall of said bore forms a stop limiting approach of the piston 23 to the port 24. Under normal or non-braking conditions, the piston occupies the outer portion of the bore 22 and abuts the button 26, and when so positioned, the piston 23 uncovers the outermost of two ports 27 and 28 opening into the bore from the ends of a fluid passage 29, substantially parallel to the bore, said ports being so spaced that the piston, when inwardly shifted may lie between them. The inner end of the bores 22 and 14 are separated by a partition formed with a port 30, and a passage 31 leads from the inner end of the bore 14a to the outer end of the bore 22.

To provide for air withdrawal from the bores 14 and 14a, when necessary, bleeder ports 32 extend from the inner ends of said bores and are independently controlled by the customary normally closed valves 33.

A pair of coiled springs 34 and 34a interconnect the end portions of the shoes 5 and 5a, normally retracting them and maintaining their ends engaged with the stud 8 and pistons 13 and 13a.

In use of the described brake, retraction of the piston 13 is limited by a volume of oil or other pressure liquid trapped by the retracted piston 23 in the communicating end portions of the bores 14 and 22, this volume being predeterminedly such as to establish a correct clearance between the shoe 5 and the drum. The correct clearance position of the shoe 5a is normally established through seating of the flange 13b of the piston 13a against the cylinder block. When a braking control is exercised, the piston 23 is actuated toward the cylinder block, increasing the liquid volume in the bore 14 and thus forcing the piston 13 outward to its effective position. It is here to be noted that the diameter of the piston 23 is considerably less than that of the pistons 13 and 13a and hence any given travel of the piston 23 will induce a considerably less travel of the piston 13. Also oil is delivered through the passage 31 to the bore 14a to establish the effective position of the piston 13a. Travel of the piston 23 is slight prior to wear of the shoes (being always adequate to close the port 27, however), and increases as successive applications of the brake produce wear of the shoe 5. Eventually clearance between the shoe 5 and the drum under non-braking conditions increases to an extent permitting the piston 23 to advance, as the brake is applied, to a position between the ports 27 and 28. This is the limiting inward position of the piston 23 since in such position a by-pass around said piston is substantially established by the passage 29, and said limiting position will be established upon all subsequent applications of the brake until the shoe linings are replaced. Wear of the linings corresponding to said inner limiting position of the piston 23 is slight and compensation for the considerable wear to which said linings will eventually be subjected is accomplished by a by-passing of liquid through the passage 29. Such by-passing progressively increases the volume of liquid trapped behind the piston 13, since there will be no by-passing in a reverse direction. That is to say, upon a release of the brake, the piston 23 recedes immediately responsive to contraction of the shoes, closing the port 27 and hence closing the by-pass. Thus the non-braking clearance of the shoe 5 from the drum becomes a constant, following such slight initial wear as entails a travel of the piston 23 to its described inner limiting position.

The construction requires no compensation for wear of the shoe 5a, owing to provision made by the swinging link 9 for circumferential floating of the two shoes. That is to say, any application of the shoe 5 will immediately entail an application of the shoe 5a since the shoe 5 will momentarily participate in rotation of the drum, reacting through the link 9 on the shoe 5a to apply the latter. The fact, therefore, that the shoe 5a may acquire through wear an undue clearance from the drum is no detriment.

The described pivotal mounting of the cylinder block 15 is advantageous in obtaining selective braking effects and avoiding a locking engagement of the shoes with the drum, independently of the magnitude of the applied effort, due to wrapping effect. That effect is counteracted by an inward swinging of the cylinder block, relieving pressure on the drum of the piston-engaging ends of the shoes. Such swinging of the block is due to the thrust applied by the shoe 5a under drum-imposed torque, the location of the pivot pin 17 radially inward from the point of thrust application, affording a leverage to effect such swinging. Retraction of the shoes upon relief of braking pressure serves to again establish the normal illustrated position of the cylinder block.

The described construction is believed to minimize expense in compensating for wear in a brake of the type disclosed.

It is to be noted that the link 9, under non-braking conditions, diverges in a direction opposed to drum rotation from the radius established by its pivot pin 10. Because of this divergency when the two shoes float slightly in the direction of drum rotation due to drum-applied torque, the shoe ends to which the link is connected are moved outward as well as circumferentially and thus are forced against the drum. In most shoe type brakes, the pivoted end portions of the shoes fail completely to engage the drum, whereas in described brake, the full lengths of the shoes are utilized.

What I claim is:

In a brake mechanism, a brake drum, brake friction means supported within the drum for engagement therewith and having ends spaced circumferentially of the drum, a cylinder block disposed between said ends and formed with two separate bores opening in opposite ends of said block, a pair of pistons slidable in said bores to and from each other for respectively moving the respective spaced ends into engagement with the drum, means for delivering a fluid under pressure to the mutually adjacent ends of said bores, such means affording a free withdrawal of the fluid from one of said bores, means for trapping a volume of the pressure fluid in the other bore behind the piston therein under non-braking conditions and for progressively increasing such volume in proportion to wear of the shoe actuable by such piston, and means for yieldably retracting the shoes.

CHARLES A. SAWTELLE.